US006783709B2

(12) United States Patent
Harreld et al.

(10) Patent No.: US 6,783,709 B2
(45) Date of Patent: Aug. 31, 2004

(54) SELF-HEALING ORGANOSILOXANE MATERIALS CONTAINING REVERSIBLE AND ENERGY-DISPERSIVE CROSSLINKING DOMAINS

(75) Inventors: John H. Harreld, Santa Barbara, CA (US); Michael S. Wong, Houston, TX (US); Paul K. Hansma, Isla Vista, CA (US); Daniel E. Morse, Santa Barbara, CA (US); Galen D. Stucky, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/193,533

(22) Filed: Jul. 10, 2002

(65) Prior Publication Data

US 2004/0007792 A1 Jan. 15, 2004

(51) Int. Cl.$^7$ .......................... B29C 73/16; C08G 77/42
(52) U.S. Cl. .................. 264/36.22; 264/36.1; 525/474; 525/919; 528/25; 528/26; 528/28
(58) Field of Search ........................... 264/36.1, 36.22; 525/474, 919; 528/25, 26, 28

(56) References Cited

U.S. PATENT DOCUMENTS

| | | | |
|---|---|---|---|
| 2,710,290 A | | 6/1955 | Safford et al. |
| 3,189,662 A | | 6/1965 | Vaughn, Jr. |
| 3,562,353 A | | 2/1971 | Chow |
| 3,821,325 A | | 6/1974 | Merritt, Jr. |
| 3,832,419 A | | 8/1974 | Merritt, Jr. |
| 4,604,442 A | | 8/1986 | Rich |
| 4,675,372 A | | 6/1987 | Policastro |
| 5,733,538 A | * | 3/1998 | Riffle ...................... 424/78.08 |
| 6,358,501 B1 | * | 3/2002 | Dietz et al. .............. 424/70.12 |
| 6,517,933 B1 | | 2/2003 | Soane et al. |

FOREIGN PATENT DOCUMENTS

EP  0525741 B1  7/1992

OTHER PUBLICATIONS

English translation of JP 07–223921, Yoshioka et al. Aug. 1995, obtained from JPO web–site.*
Baney, R.H., et al., "Silsesquioxanes," *Chem. Rev.*, 1995, 95:1409–1430.
Dry, C., "Procedures developed for self–repair of polymer matrix composite materials," *Comp. Struct.*, 1996, 35:263–269.
Feher, F.J., et al., "Octafunctionalized polyhedral oligosilsesquioxanes as scaffolds: synthesis of peptidyl silsesquioxanes," *Chem. Commun.*, 1998, pp. 1469–1470.
R.D.B. Fraser and T.P. Macrae, *Conformation in Fibrous Proteins and Related Synthetic Polypeptides*, Academic Press, New York, 1973, pp. 293–556.
Hench, L.L., "Biomaterials", *Science*, 1980, 208:826–831.
Heuer, A.H., et al., "Innovative materials processing strategies: a biomimetic approach," *Science*, 1992, 255:1098–1105.
J. Hwang and T. Deming, "Methylated mono– and di(ethylene glycol)–functionalized β–sheet forming polypeptides," *Biomacromolecules*, 2001, 2:17–21.
S.H. Imam, R.V. Greene, and B.R. Zaidi, *Biopolymers: Utilizing Nature's Advanced Materials*, American Chemical Society, Washington, D.C., 1999, pp. 2–11.
Y. Imanishi and T. Kumaki, "Antithrombogenic and Gas–Permeable Membrane of Silicone–Peptide block and Graft Copolymers," *International Union of Pure and Applied Chemistry (IUPAC): 28$^{th}$ Macromolecular Symposium*, University of Massachusetts, Amherst, Massachusetts, 1982, p. 389.
Imperante, J., et al., "Silicone protein polymers," *Soaps/Cosmetics/Chemical Specialties*, Oct. 1994, pp. 32–40.
Kang, I.K., et al., "Synthesis, antithrombogenicity and gas permeability of copolypeptides having silyl groups or dimethylsiloxane oligomers substituted in the side chains," *Int. J. Biol. Macromol.*, 1988, 10:169–177.
Kania, C.M., et al., "Preparation of poly(dimethylsiloxane-)–polypeptide block copolymers," *J. Appl. Poym. Sci.*, 1982, 27:139–148.
Kudaibergenov, S.E., "Recent advances in the study of synthetic polyampholytes in solutions," *Advances in Polym. Sci.*, 1999, 144:115–197.
M Kurihara, M. Kamachi, and J.K. Stille, "Synthesis of ionic block polymers for desalination membranes," *J. Polym.Sci.*, 1973, 11:587–610.
Mann, S., *Biomimetic Materials Chemistry*, VCH, New York, 1996, pp. 249–278, 315–336.
National Materials Advisory Board, *Hierarchical Structures in Biology as a Guide for New Materials Technology*, National Academy Press, 1994, pp. 1–110.
Noll, W., *Chemistry and Technology of Silicones*, Academic, New York, 1968, pp. 368–379.
Rief, M., et al., "Reversible unfolding of individual titin immunoglobin domains by AFM," *Science*, 1997, 276:1109–1112.

(List continued on next page.)

Primary Examiner—Jeffrey B. Robertson
(74) Attorney, Agent, or Firm—David W. Maher; Bingham McCutchen LLP (57) ABSTRACT

Self-healing copolymeric materials comprising a plurality of intermediate strength crosslinks are provided. The copolymeric materials comprise a silicon component and a plurality of crosslinking components. The crosslinking components comprise a polymeric structure forming a structure held together by ionic and/or hydrogen bonding with a net intermediate strength. The plurality of intermediate strength crosslinks provide toughness to the material, and allow for rehealing by allowing reforming of the crosslinks after a disruptive stress incidence. The material is also suited for recasting, and can be used as an active matrix by incorporating additional substances. Articles of manufacture incorporating such materials, and methods of recasting such materials are also provided.

48 Claims, 3 Drawing Sheets

OTHER PUBLICATIONS

Smith, A.L., *The Analytical Chemistry of Silicones*, John Wiley & Sons, Inc., New York, 1991, pp. 3–19, 85–91, 135–165, 242–251.

Smith, B.L., "Molecular Mechanistic origin of the toughness of natural adhesives, fibres and composites," *Nature*, 1999, 399:761–763.

Smith, S.D., "Synthesis and characterization of poly(methylmethacrylate)–g–poly(dimethylsiloxane) copolymers.1. Bulk and surface characterization," *Macromolecules*, 1992, 25:2575–2581.

Svensson, M., et al., "Phase properties in relation to mesogen length in chiral side–chain polysiloxanes," *Polymer*, 1997, 38:3269–3278.

Thompson, J.B., et al., "Bone indentation recovery time correlates with bond reforming time," *Nature*, 2001, 414:773–776.

Vaughn, J.R., H.A., "The synthesis and properties of alternating block polymers of dimethylsiloxane and bisphenol–A carbonate," *Polymer Letters*, 1969, 7:569–572.

Vincent, J., *Structural Biomaterials*, Princeton University Press, Princeton, 1990, pp. 1–72, 95–125, 210–223.

Waite, J.H., "Marine adhesive proteins: natural composite thermosets," *Int. J. Biol. Macromol.*, 12:139–144, 1990.

Wake, W.C., "Silicone adhesives, sealants, and coupling agents," *Crit. Rep. Appl. Chem.*, 1987, 16:89.

White, S.R., et al., "Autonomic healing of polymer composites," *Nature*, 2001, 409:794–797.

Wool, R.P., *Polymer Interfaces: Structure and Strength*, Chapter. 12, pp. 445–479, Hanser/Gardner, Cincinnati. 1995.

H. Zhuang and J.A. Gardella, Jr., "Solvent effects on the surface composition of bisphenol a polycarbonate and poly-dimethylsiloxane (BPAC–PDMS) random block copolymers," *MacroMolecules*, 1997, 30:3632–3639.

\* cited by examiner

SELF-HEALING ORGANOSILOXANE MATERIALS CONTAINING REVERSIBLE AND ENERGY-DISPERSIVE CROSSLINKING DOMAINS

TECHNICAL FIELD

This invention relates to copolymeric crosslinked materials, articles incorporating them and methods of using them.

BACKGROUND OF THE INVENTION

Silicones are ubiquitous in commercially available manufactured goods as well as high-technology applications. Common forms of silicones include oils, rubbers, resins, and hard solids. The broad range of beneficial properties of this class of materials has led to their immense technological and commercial importance. Examples of such properties include their low dielectric constant, thermomechanical stability, biocompatability, optical transparency, highly variable mechanical hardness from rigid to elastic, controllable porosity, and a wide range of available interfacial properties from hydrophilic to extremely hydrophobic that depend on the type and concentration of organic modification. Moreover, the members of this class of materials may be synthesized via low temperature chemical processes that allow the incorporation of organic components and molecular additives.

Silicones are formed by converting silicone pre-polymers and resins into polymers, gels, and glasses by forming intermolecular siloxane (—Si—O—Si—) and/or carbon-carbon covalent bonds via crosslinking processes (also termed "vulcanization" or "curing") [1,2]. Typically, the new chemical bonds are introduced by the addition of peroxide compounds under ambient or elevated temperature, by reaction with or catalysis by organometallic or organo-silicon compounds, by exposure to high energy radiation, or by condensative polymerization of residual silanol groups (—Si—OH) with another silanol or silane (—Si—H).

Silicones have a number of characteristics that limit their use. One limitation of covalently crosslinked silicones is that the crosslinks are not reformed if broken by thermal or mechanical forces. Another is that silicone materials often exhibit a very low fracture toughness (or "tear-resistance"). A few instances of improving toughness in silicones have been demonstrated by chemically bonding organic polymer segments with polysiloxane segments to form alternating block copolymers [5–9]. Lastly, silicones are not generally processable after they are completely cured and instead take a permanent shape.

Biological material systems have long been studied for their extraordinary mechanical properties, including combinations of adhesion, strength, flexibility, fatigue resistance, and self-repair that remain unmatched in synthetic systems [10–18, 37]. So-called secondary structures are essential for providing the characteristic high-toughness properties of natural structural proteins such as keratins, collagens, silk, and lustrin. In each of these, self-assembled arrays of inter- and intramolecular hydrogen bonds act in concert to stabilize the material [14–18]. These secondary structures are often assembled together as components of complex hierarchically ordered materials. To a large extent, however, it is the ability of the secondary structures to be reversibly disassembled and re-formed that is responsible for the toughness of natural fibers and adhesives as well as being a key to their observed self-repair and resistance to fatigue stresses.

There is a need in the art for self-healing materials, and for devices, compositions and articles of manufacture useful in such methods.

SUMMARY OF THE INVENTION

The present invention combines the impressive characteristics of biological structural materials into technologically useful silicon-based polymeric material systems. A crosslinked copolymeric material comprising an optionally substituted silicon component and a plurality of noncovalent crosslinking components is provided. The silicon components are attached to a plurality of crosslinking components which crosslink the material with a plurality of intermediate strength bonds which components on other silicon components. The crosslinking components may be end-linked to the end of linear silicon components, may be side-grafted to the silicon component, or both. The silicon components comprise a polymer selected from silicates, siloxanes, and silsesquioxanes, and mixtures and combinations thereof. The crosslinking components comprise polymeric domains which form intermediate-strength crosslinks by virtue of hydrogen and/or ionic bonding, either intramolecularly or intermolecularly. The intermediate-strength crosslinks provide a good overall toughness to the material, while allowing for self-healing by reformation of crosslinks after a stress incidence. Additionally, the intermediate-strength crosslinks allow for recasting of the material. Methods of recasting the material thus provided are also described, as are articles of manufacture incorporating the material.

Such energy-dispersive, self-healing materials can be incorporated in a variety of existing silicone applications as well as new applications, including as advanced marine or biomedical adhesives, as sealant compounds or components, in lightweight armors, as wear-resistant fibers, in protective and/or decorative coatings, in thermal insulators, in optical and electronic components, in satellites, and in biomedical devices.

DETAILED DESCRIPTION OF THE INVENTION

A new design strategy has been developed for chemically synthesizing silicon-containing polymers with other polymer systems to make hybrid material configurations that have many novel and technologically beneficial properties. A critical aspect of this new class of materials is that they are reinforced with crosslinking agents that (1) are capable of dispersing fracture energy in response to stress and (2) contain a mechanism for self-healing after yielding to rupture or deformation. This new concept for siloxane crosslinking is inspired by naturally occurring molecular architectures that have been identified in biological materials that exhibit exceptionally high strength and toughness properties.

The crosslinking agent consists of polymer or oligomer segments that are attached to the silicon component and are capable of self-assembly into secondary structures through ionic and/or hydrogen-bonding interactions. Subsequent impact or fracture energy is dispersed by the disruption of ionic and/or hydrogen bond arrays as crosslinks are disrupted. The cumulative strength provided by many such reversible intermediate-strength crosslinks may be continually or periodically reformed unlike conventional rigid covalent linkages. Moreover, the synthetic approach and resulting materials allow for solvent casting of fully-"cured" materials and reprocessing of previously molded materials.

Many unique mechanical properties of materials formed by this approach are owed to the reversible nature of hydrogen and ion-pair bonding from the crosslinking component. Unlike conventional crosslinking methodologies, which are limited to covalently bonded bridges, materials linked by domains that are assembled with intermediate-strength bonding interactions may be broken and reformed without damaging the chemical backbone of either component. As the molecular constituents of a material are displaced from one another by mechanical strain, the severing of reversible crosslinks causes the absorption and dispersion of energy and thereby enhances fracture toughness. After being separated, the individual crosslinking components are still intact and viable for reforming crosslinks. Continuing shear deformation may bring together new crosslinking pairs. Thus while exposed to mechanical stress and the resulting strain, the material disperses energy with the loss of each individual secondary structure and yet new reinforcements may be continuously formed. Reversible crosslinking is the basis for providing the improved properties of high-toughness, plasticity, and self-healing ability to silicon-containing polymers. Moreover, when characteristically hydrophobic silicone materials (e.g. polyorganosiloxanes and polyorganosilsesquioxanes) are used as the hydrophobic component in hydrophobic/hydrophilic hybrid copolymeric materials, the tendency for phase separation provides a thermodynamic driving force for the active formation of crosslinks based on hydrogen or ionic bonding.

In addition to enhanced mechanical properties, network-forming materials that are based on reversible crosslinking offer improved processing characteristics including the ability to repair and recast materials after curing. Unlike strong covalent bonds, intermediate-strength hydrogen bonds or ionic bonds may be weakened by controlling the local environmental conditions by carefully selected solvent or thermal changes. For example, a hybrid material comprising polydimethylsiloxane crosslinked with beta-sheet-forming polypeptides will be subject to dissolution for the purposes of recasting or crack-repair by a solvent system having an appropriate mixture of hydrophobicity and hydrophilicity to simultaneously swell the siloxane network and disrupt the hydrogen bonded crosslinks. However, the same material will be generally resistant to organic solvents due to tightening of hydrophilic peptide domains, while also resistant to polar solvents and solutions due to a tightening of the siloxane network.

Before the present invention is described in further detail, it is to be understood that this invention is not limited to the particular methodology, devices, solutions or apparatuses described, as such methods, devices, solutions or apparatuses can, of course, vary. It is also to be understood that the terminology used herein is for the purpose of describing particular embodiments only, and is not intended to limit the scope of the present invention.

Use of the singular forms "a," "an," and "the" include plural references unless the context clearly dictates otherwise. Thus, for example, reference to "a first copolymer" includes a plurality of first copolymers, reference to "a silicon component" includes a plurality of such silicon components, reference to "a crosslinking component" includes a plurality of crosslinking components, and the like. Additionally, use of specific plural references, such as "two," "three," etc., read on larger numbers of the same subject less the context clearly dictates otherwise.

Terms such as "connected," "attached," "linked," and "conjugated" are used interchangeably herein and encompass direct as well as indirect connection, attachment, linkage or conjugation unless the context clearly dictates otherwise. Where a range of values is recited, it is to be understood that each intervening integer value, and each fraction thereof, between the recited upper and lower limits of that range is also specifically disclosed, along with each subrange between such values. The upper and lower limits of any range can independently be included in or excluded from the range, and each range where either, neither or both limits are included is also encompassed within the invention. Where a value being discussed has inherent limits, for example where a component can be present at a concentration of from 0 to 100%, or where the pH of an aqueous solution can range from 1 to 14, those inherent limits are specifically disclosed. Where a value is explicitly recited, it is to be understood that values which are about the same quantity or amount as the recited value are also within the scope of the invention, as are ranges based thereon. Where a combination is disclosed, each subcombination of the elements of that combination is also specifically disclosed and is within the scope of the invention. Conversely, where different elements or groups of elements are disclosed, combinations thereof are also disclosed. Where any element of an invention is disclosed as having a plurality of alternatives, examples of that invention in which each alternative is excluded singly or in any combination with the other alternatives are also hereby disclosed; more than one element of an invention can have such exclusions, and all combinations of elements having such exclusions are hereby disclosed.

Unless defined otherwise or the context clearly dictates otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

All publications mentioned herein are hereby incorporated by reference for the purpose of disclosing and describing the particular materials and methodologies for which the reference was cited. The publications discussed herein are provided solely for their disclosure prior to the filing date of the present application. Nothing herein is to be construed as an admission that the invention is not entitled to antedate such disclosure by virtue of prior invention.

DEFINITIONS

In describing the present invention, the following terms will be employed, and are intended to be defined as indicated below.

"Alkyl" refers to a branched, unbranched or cyclic saturated hydrocarbon group of 1 to 24 carbon atoms optionally substituted at one or more positions, and includes polycyclic compounds. Examples of alkyl groups include optionally substituted methyl, ethyl, n-propyl, isopropyl, n-butyl, s-butyl, t-butyl, n-pentyl, isopentyl, neopentyl, n-hexyl, n-heptyl, n-octyl, n-decyl, hexyloctyl, tetradecyl, hexadecyl, eicosyl, tetracosyl and the like, as well as cycloalkyl groups such as cyclopropyl, cyclobutyl, cyclopentyl, cyclohexyl, cycloheptyl, cyclooctyl, adamantyl, and norbornyl. The term "lower alkyl" refers to an alkyl group of 1 to 6 carbon atoms, preferably 1 to 4 carbon atoms. Exemplary substituents on substituted alkyl groups include hydroxyl, cyano, alkoxy, =O, =S, —NO$_2$, halogen, haloalkyl, heteroalkyl, carboxyalkyl, amine, amide, thioether and —SH.

"Alkoxy" refers to an "-Oalkyl" group, where alkyl is as defined above. A "lower alkoxy" group intends an alkoxy group containing one to six, more preferably one to four, carbon atoms.

"Alkenyl" refers to a branched, unbranched or cyclic hydrocarbon group of 2 to 24 carbon atoms containing at least one carbon-carbon double bond optionally substituted at one or more positions. Examples of alkenyl groups include ethenyl, 1-propenyl, 2-propenyl (allyl), 1-methylvinyl, cyclopropenyl, 1-butenyl, 2-butenyl, isobutenyl, 1,4-butadienyl, cyclobutenyl, 1-methylbut-2-enyl, 2-methylbut-2-en-4-yl, prenyl, pent-1-enyl, pent-3-enyl, 1,1-dimethylallyl, cyclopentenyl, hex-2-enyl, 1-methyl-1-ethylallyl, cyclohexenyl, heptenyl, cycloheptenyl, octenyl, cyclooctenyl, decenyl, tetradecenyl, hexadecenyl, eicosenyl, tetracosenyl and the like. Preferred alkenyl groups herein contain 2 to 12 carbon atoms. The term "lower alkenyl" intends an alkenyl group of 2 to 6 carbon atoms, preferably 2 to 4 carbon atoms. The term "cycloalkenyl" intends a cyclic alkenyl group of 3 to 8, preferably 5 or 6, carbon atoms. Exemplary substituents on substituted alkenyl groups include hydroxyl, cyano, alkoxy, =O, =S, —NO$_2$, halogen, haloalkyl, heteroalkyl, amine, thioether and —SH.

"Alkenyloxy" refers to an "-Oalkenyl" group, wherein alkenyl is as defined above.

"Alkylaryl" refers to an alkyl group that is covalently joined to an aryl group. Preferably, the alkyl is a lower alkyl. Exemplary alkylaryl groups include benzyl, phenethyl, phenopropyl, 1-benzylethyl, phenobutyl, 2-benzylpropyl and the like.

"Alkylaryloxy" refers to an "-Oalkylaryl" group, where alkylaryl is as defined above.

"Alkynyl" refers to a branched or unbranched hydrocarbon group of 2 to 24 carbon atoms containing at least one —C≡C— bond, optionally substituted at one or more positions. Examples of alkynyl groups include ethynyl, n-propynyl, isopropynyl, propargyl, but-2-ynyl, 3-methylbut-1-ynyl, octynyl, decynyl and the like. Preferred alkynyl groups herein contain 2 to 12 carbon atoms. The term "lower alkynyl" intends an alkynyl group of 2 to 6, preferably 2 to 4, carbon atoms, and one —C≡C— bond. Exemplary substituents on substituted alkynyl groups include hydroxyl, cyano, alkoxy, =O, =S, —NO$_2$, halogen, haloalkyl, heteroalkyl, amine, thioether and —SH.

"Amide" refers to —C(O)NR'R", where R' and R" are independently selected from hydrogen, alkyl, aryl, and alkylaryl.

"Amine" refers to an —N(R')R" group, where R' and R" are independently selected from hydrogen, alkyl, aryl, and alkylaryl.

"Aryl" refers to an aromatic group that has at least one ring having a conjugated pi electron system and includes carbocyclic, heterocyclic and polycyclic aryl groups, and can be optionally substituted at one or more positions. Typical aryl groups contain 1 to 5 aromatic rings, which may be fused and/or linked. Exemplary aryl groups include phenyl, furanyl, azolyl, thiofuranyl, pyridyl, pyrimidyl, pyrazinyl, triazinyl, indenyl, benzofuranyl, indolyl, naphthyl, quinolinyl, isoquinolinyl, quinazolinyl, pyridopyridinyl, pyrrolopyridinyl, purinyl, tetralinyl and the like. Exemplary substituents on optionally substituted aryl groups include alkyl, alkoxy, alkylcarboxy, alkenyl, alkenyloxy, alkenylcarboxy, aryl, aryloxy, alkylaryl, alkylaryloxy, fused saturated or unsaturated optionally substituted rings, halogen, haloalkyl, heteroalkyl, —S(O)R, sulfonyl, —SO$_3$R, —SR, —NO$_2$, —NRR', —OH, —CN, —C(O)R, —OC(O)R, —NHC(O)R, —(CH2)$_n$CO$_2$R or —(CH2)$_n$CONRR' where n is 0–4, and wherein R and R' are independently H, alkyl, aryl or alkylaryl.

"Aryloxy" refers to an "-Oaryl" group, where aryl is as defined above.

"Carbocyclic" refers to an optionally substituted compound containing at least one ring and wherein all ring atoms are carbon, and can be saturated or unsaturated.

"Carbocyclic aryl" refers to an optionally substituted aryl group wherein the ring atoms are carbon.

"Halo" or "halogen" refers to fluoro, chloro, bromo or iodo. Of the halogens, chloro and fluoro are generally preferred. "Halide" refers to the anionic form of the halogens.

"Haloalkyl" refers to an alkyl group substituted at one or more positions with a halogen, and includes alkyl groups substituted with only one type of halogen atom as well as alkyl groups substituted with a mixture of different types of halogen atoms. Exemplary haloalkyl groups include trihalomethyl groups, for example trifluoromethyl.

"Heteroalkyl" refers to an alkyl group wherein one or more carbon atoms and associated hydrogen atom(s) are replaced by an optionally substituted heteroatom, and includes alkyl groups substituted with only one type of heteroatom as well as alkyl groups substituted with a mixture of different types of heteroatoms. Heteroatoms include oxygen, sulfur, and nitrogen. As used herein, nitrogen heteroatoms and sulfur heteroatoms include any oxidized form of nitrogen and sulfur, and any form of nitrogen having four covalent bonds including protonated forms. An optionally substituted heteroatom refers to replacement of one or more hydrogens attached to a nitrogen atom with alkyl, aryl, alkylaryl or hydroxyl.

"Heterocyclic" refers to a compound containing at least one saturated or unsaturated ring having at least one heteroatom and optionally substituted at one or more positions. Typical heterocyclic groups contain 1 to 5 rings, which may be fused and/or linked, where the rings each contain five or six atoms. Examples of heterocyclic groups include piperidinyl, morpholinyl and pyrrolidinyl. Exemplary substituents for optionally substituted heterocyclic groups are as for alkyl and aryl at ring carbons and as for heteroalkyl at heteroatoms.

"Heterocyclic aryl" refers to an aryl group having at least 1 heteroatom in at least one aromatic ring. Exemplary heterocyclic aryl groups include furanyl, thienyl, pyridyl, pyridazinyl, pyrrolyl, N-lower alkyl-pyrrolo, pyrimidyl, pyrazinyl, triazinyl, tetrazinyl, triazolyl, tetrazolyl, imidazolyl, bipyridyl, tripyridyl, tetrapyridyl, phenazinyl, phenanthrolinyl, purinyl and the like.

"Hydrocarbyl" refers to hydrocarbyl substituents containing 1 to about 20 carbon atoms, including branched, unbranched and cyclic species as well as saturated and unsaturated species, for example alkyl groups, alkylidenyl groups, alkenyl groups, alkylaryl groups, aryl groups, and the like. The term "lower hydrocarbyl" intends a hydrocarbyl group of one to six carbon atoms, preferably one to four carbon atoms.

A "substituent" refers to a group that replaces one or more hydrogens attached to a carbon or nitrogen. Exemplary substituents include alkyl, alkylidenyl, alkylcarboxy, alkoxy, alkenyl, alkenylcarboxy, alkenyloxy, aryl, aryloxy, alkylaryl, alkylaryloxy, —OH, amide, carboxamide, carboxy, sulfonyl, =O, =S, —NO$_2$, halogen, haloalkyl, fused saturated or unsaturated optionally substituted rings, —S(O)R, —SO$_3$R, —SR, —NRR', —OH, —CN, —C(O)R, —OC(O)R, —NHC(O)R, —(CH2)$_n$CO$_2$R or —(CH2)$_n$CONRR' where n is 0–4, and wherein R and R' are independently H, alkyl, aryl or alkylaryl. Substituents also include replacement of a carbon atom and one or more associated hydrogen atoms with an optionally substituted heteroatom.

"Optional" or "optionally" means that the subsequently described event or circumstance may or may not occur, and that the description includes instances where said event or circumstance occurs singly or multiply and instances where it does not occur at all. For example, the phrase "optionally substituted alkyl" means an alkyl moiety that may or may not be substituted and the description includes both unsubstituted, monosubstituted, and polysubstituted alkyls.

"Polypeptide" and "protein" are used interchangeably herein and include a molecular chain of amino acids linked through peptide bonds. The terms do not refer to a specific length of the product. Thus, "peptides," "oligopeptides," and "proteins" are included within the definition of polypeptide. The terms include polypeptides containing modifications of the polypeptide, for example, glycosylations, acetylations, phosphorylations, and sulphations. In addition, protein fragments, analogs (including amino acids not encoded by the genetic code, e.g. homocysteine, ornithine, D-amino acids, and creatine), natural or artificial mutants or variants or combinations thereof, fusion proteins, and proteins comprising derivatized residues (e.g. alkylation of amine groups, acetylations or others esterifications of carboxyl groups) and the like are included within the meaning of polypeptide.

"Silicate" refers to an oligomeric or polymeric material comprising alternating silicon and oxygen atoms of the general formula SiO$_2$ ("Q" units). Polysilicates may terminate with other groups, e.g., hydrogens, hydroxyls, alkoxyls, amines, thiols, etc., and may be fused to trisubstituted silanes ("M" units), disubstituted siloxanes ("D" units) and/or monosubstituted silsesquioxanes ("T" units).

"Silicon component" refers to a polymeric material comprising alternating silicon and oxygen atoms which forms a part of a copolymer used to form the crosslinked copolymeric material described herein. The silicon component may comprise a silicate, a siloxane, a silsesquioxane, or mixtures of two or three thereof. The silicon component may be optionally linked to or incorporate other materials. The silicon component may be represented by the general formula: $(R_aX_{3-a}SiO_{1/2})_m(R_bX_{2-b}SiO)_d(R_cX_{1-c}SiO_{3/2})_t (SiO_2)_q$ where a=0–3, =0–2, c=0–1, R and X are as described with respect to siloxanes and silsesquioxanes, m+d+t+q=1.0, m=0–1 (molar ratio of "M" units), d=0–1 (molar ratio of "D" units), t=0–1 (molar ratio of "T" units), and q=0–1 (molar ratio of "Q" units).

"Silicone" refers to any of a large class of siloxanes or silsesquioxanes having a broad range of thermal stability, high lubricity, extreme water repellence, and physiological inertness. Silicones are used in adhesives, lubricants, protective coatings, paints, electrical insulation, synthetic rubber, and coatings, and may be used in biomedical devices.

"Siloxane" refers to any of a large class of polymeric compounds that have alternate silicone and oxygen atoms of the general formula "R$_2$SiO" ("D" units) or "R$_3$SiO$_{1/2}$" ("T" units) where R is selected from H, aryl, alkyl, alkenyl, alkynyl, alkylaryl, halogen, alkyloxy, alkenyloxy, aryloxy, and alkaryloxy as defined above, and mixtures thereof. Siloxanes may terminate with any silane or organic funtional group as defined in the case of silicates. A percentage of the repeating units of the siloxane can optionally be substituted with a derivatizable group as the R group; when so substituted, the derivatizable substituent may be referred to as an "X" group, rather than an R group. X groups may include any functionality which can be derivatized or substituted (e.g. vinyl, hydride, silanol, amine, epoxy, hydroxyalkyl, methacrylate, acrylate, mercapto, chloroalkyl, carboxylate, chlorine, acetoxy, dimethylamine, and alkoxy functionalities), and can include mixtures of such functionalities. A substituted siloxane typically has about 1% or more, and typically about 99% or less, of the R groups replaced with X groups. Where substituted, preferably about 5% or more, and preferably about 40% or less, of the R groups are replaced with X groups.

"Organosiloxane" refers to a siloxane comprising an organic group or groups. "Organic group" refers to an alkyl, alkenyl, alkynyl, aryl, or alkylaryl as defined herein attached directly or indirectly (e.g., through an ether or other linkage) to a silicon atom.

"Silsesquioxane" refers to any of a large class of polymeric compounds that have alternate silicone and oxygen atoms of the general formula "RSiO$_{3/2}$," where R is selected from H, aryl, alkyl, alkenyl, alkynyl, alkylaryl, halogen, alkyloxy, alkenyloxy, aryloxy, and alkaryloxy as defined above, and mixtures thereof. Silsesquioxanes may be referred to as "T" units in mixed resin systems. Silsesquioxanes may terminate with a siloxane, silane, silanol, or other group , or may be covalently closed. A percentage of the repeating units of the silsesquioxane can optionally be substituted with a derivatizable group as the R group; when so substituted, the derivatizable substituent may be referred to as an "X" group, rather than an R group. X groups may include any functionality which can be derivatized or substituted (e.g. vinyl, hydride, silanol, amine, epoxy, hydroxyalkyl, methacrylate, acrylate, mercapto, chloroalkyl, carboxylate, chlorine, acetoxy, dimethylamine, and alkoxy functionalities), and can include mixtures of such functionalities. A substituted silsesquioxane typically has about 1% or more, and typically about 99% or less, of the R groups replaced with X groups. Where substituted, preferably about 5% or more, and preferably about 40% or less, of the R groups are replaced with X groups.

"Sulfonyl" refers to —S(O)$_2$R, where R is aryl, —C(CN) =C-aryl, —CH$_2$CN, alkylaryl, or amine.

"Thioamide" refers to —C(S)NR'R", where R' and R" are independently selected from hydrogen, alkyl, aryl, and alkylaryl.

"Thioether" refers to —SR, where R is alkyl, aryl, or alkylaryl.

The Crosslinked Copolymeric Material

The crosslinked polymeric material of the invention comprises first and second copolymers. The first and second copolymers each comprise a respective silicon component and at least two respective crosslinking components. The first and second copolymers, which may be the same or different, are crosslinked through a plurality of intermediate strength bonds formed by their respective first and second crosslinking components to form a crosslinked copolymeric material. The plurality of crosslinks need not be formed between the same first and second copolymer, but may form extended networks of alternating first and second (or more) copolymers, in three dimensions, bound through intermediate strength crosslinks. The material must also exhibit self-healing, or the ability to reform at least a fraction of the intermediate strength crosslinks after disruption by a stress incidence.

The silicon components, which may be the same or different, each independently comprise a polymer selected from a silicate, a siloxane, a silsesquioxane, or mixtures of two or three thereof. More than two different copolymers may be included in the crosslinked copolymeric material.

The crosslinking components are polymers which bind the two copolymers and are attached, typically covalently, to the silicon components. The crosslinking components may be self-complementary, or may be members of complementary binding pairs. In some instances, the first and second crosslinking components are part of the same molecule which forms a covalent bridge between two of the silicon components; in such cases, the crosslinking components may comprise a series of alpha helix-forming peptides, beta sheet-forming peptides, and/or ionic loops, which self-assemble into such structures which are held together through intermediate strength bonds and which can individually unfold upon a stress incidence.

The crosslinking components of the crosslinked copolymeric material may form graft and/or block copolymers with the silicon component(s). Any form of block copolymers can be used, or mixtures of block copolymers, including ABA, ABAB, ABABA, etc., where A is the crosslinking component and B is the silicon component, and may additionally include side-grafted crosslinking components. Or the copolymer may comprise only side-grafted crosslinking components. The first and second copolymers each comprise at least two crosslinking components, and may independently comprise 3, 4, 5, 10, 15, 20, 25, 50, 100, 200, 500, 1000 or more crosslinking components. The degree of crosslinking and the number of copolymers to which a given copolymer is bound may be quite high. For large silicon components of effectively "infinite" length (i.e. glass, gel, or microgel network), the total number of attached crosslinking components can be quite high, and the amount of crosslinking can be more accurately represented as a degree or percent crosslinking.

The structure of the copolymer(s) can be varied in a number of ways to control the properties of the crosslinked copolymeric material that is produced. Many modifications can be made to the silicon and crosslinking components that significantly affect the physical and processing characteristics of the final product. Such modifications include: the molecular weight distributions of the components, structural configurations, selection of organic constituents, and degree of crosslinking of the copolymer; the strength of the crosslinks and their propensity to form (which can be controlled by the compositions and molecular weights of the crosslinking component); and the use of synthetically modified polypeptides that form structures with improved physical properties and/or processability [33]. Additional variations include the incorporation of covalent bonds in addition to intermediate-strength bonds. For example, a copolymer comprising noncovalent intermediate-strength crosslinks with secondary structures for improved toughness can be augmented with conventional covalent bonds to contribute additional strength or hardness to the final material.

The crosslinked copolymeric material may take the form of a gel or solid, and preferably has at least some degree of flexibility. The material preferably can be dissolved in at least one solvent or solvent system and can also be separated from a solvent or solvent system in the form of a solid or semisolid gel. The copolymeric material preferably has solubility characteristics different from those of either starting material as well as the individual components of the copolymers to allow for the separation of the final crosslinked material from the precursors.

The gel formed by grafting on the crosslinking domains preferably exhibits different solubility properties than either of the starting materials for ease of separation. For example, a polyglycine 18 mer normally dissolves in a solution of lithium bromide; the material described in Example 1 formed by grafting the same 18 mer onto derivatized polydimethylsilane no longer dissolves in room temperature aqueous lithium bromide. However, 70° C. lithium bromide does dissolve the material produced in Example 1. Additionally, the solid material of example 1 does not take up water or tetrahydrofuran (THF), but will swell in hot THF.

The material may be incorporated into any of a variety of articles of manufacture, including as coatings which decorate and/or protect an article, as a component of an armor, as an adhesive (e.g., a capture tape), in a thermal insulator, in an optical component, in an electrical component, or in a biomedical device. The compositions described herein are not limited only to passive materials but may also take the form of an active matrix, encompassing materials of sizes ranging from the molecular to macroscopic that are physically and/or chemically responsive. Responsive materials can be provided by using the siloxane networks as a matrix to support other organic and/or inorganic components via dissolution, encapsulation, and/or covalent tethering. Examples of active components that can be used to provide responsiveness to a composite material include electrochemically active, magnetic, piezoelectric, photovoltaic, photocatalytic, and/or fluorescent particles, quantum dots, chromophores such as laser dyes or optical limiting dyes, conducting polymers, transition metal oxides that change color or electronic resistivity due to changes in the of their surroundings (e.g. of water content, oxygen content, etc.), or bioactive compounds such as enzymes or nucleic acids.

The Silicon Component

The silicon component is a polymeric material comprising alternating silicon and oxygen atoms and is preferably substituted, at least in part, with an organic component. The silicon component may comprise a silicate, a siloxane, a silsesquioxane, or mixtures of two or three thereof, and may optionally incorporate other materials. The silicon component can be attached to at least two derivatizable groups that are used to attach the crosslinking components. The silicon component may be represented by the general formula: $(R_aX_{3-a}SiO_{1/2})_m(R_bX_{2-b}SiO)_d(R_cX_{1-c}SiO_{3/2})_t(SiO_2)_q$, where a=0–3, b=0–2, c=0–1, R and X are as described above with respect to siloxanes and silsesquioxanes, m+d+t+q=1.0, m=0–1 (molar ratio of "M" units), d=0–1 (molar ratio of "D" units), t=0–1 (molar ratio of "T" units), and q=0–1 (molar ratio of "Q" units).

The silicon component may form a network solid or gel of essentially "infinite" molecular weight which can be formed in situ from a resin, or may be a more discrete component presynthesized for use in or adaptable for forming the copolymeric material. The silicon component can be formed from a resin through techniques known in the art, for example thermally, chemically by general acid or base catalysis, or enzymatically by silicon-depositing enzymes such as a silicatein. The resin may comprise a single precurser, or can be a mixed resin system comprising different forms of siloxane and/or silsesquioxane precursors.

In such cases, the crosslinking density may be more accurately discussed in terms of number of crosslinks per total silicon units. For the case of reinforced silica compositions, typically at least about 1%, and typically less than about 99%, of the silicon atoms are coupled to a crosslinking agent. Preferably at least about 5%, and preferably less than about 40%, of the silicon atoms are so coupled. Higher percent crosslinking can theoretically be obtained for di- and/or tri-substituted siloxanes with mixed siloxane resins, which combine "Q" ($SiO_2$, silicate) with "T", "D", and "M" units in any of the possible molar ratio combinations. However, the crosslinking density and total number of crosslinks must be such to still allow the material to exhibit release of intermediate strength crosslinks upon a stress incidence and still allow self-healing to occur.

Where silicon components of predetermined sizes or size distributions are used, they may be obtained from commercial sources or synthesized by techniques known in the art. For example, linear siloxanes of the general formula $R_2SiO$ can be used, having repeat units ranging from two to about 5,000. For silsesquioxane polymers of the general formula $RSiO_{3/2}$, a preferred size distribution can be selected in the range of from 6 to about 5,000 repeat units. Mixtures of siloxanes and/or silsesquioxanes of different size distributions can, of course, be used as the silicon component. Additionally, mixtures of "infinite" molecular weight siloxanes and/or silsesquioxanes (i.e. glass, gel, or microgel network) with siloxanes and/or silsesquioxanes of predetermined sizes can also be used. Incorporation of residual Si—OH groups in silicon components of predetermined size can allow for a condensation reaction to be performed (as by thermal treatment) in order to generate covalent Si—O—Si crosslinks between silicon components. This type of curing reaction will increase the apparent molecular weight of the siloxane precursors, as well as contributing added covalent crosslinks to the reversible intermediate-strength crosslinks.

The Crosslinking Component

Each silicon component is attached to at least two crosslinking components. The crosslinking component is a polymer containing a domain that can form an intermediate strength bond. Each silicon component is crosslinked by at least two different crosslinks to other silicon components. The individual crosslinks can involve noncovalent intermediate-strength binding between binding partners found in crosslinking components on separate silicon components, or can involve a crosslinking component which is covalently bound to two silicon components and contains at least two domains forming second structures that are held together with intermediate strength.

In the first approach, a polymeric binding domain is attached to the silicon component as the crosslinking component and binds to a corresponding binding partner on another silicon component. In principle, any polymeric domain which can bind to another polymeric domain with intermediate strength can be used. The crosslinking components in this approach can be self-complementary, so that the crosslinking components on two different silicon components can be the same and can bind to each other with intermediate strength. Or the crosslinking components on different silicon components can be different, but still complementarily bind to each other with intermediate strength. Mixtures of self- and non-self-complementary crosslinking domains can be used.

One example of a crosslinking component is a beta sheet forming peptide or synthetic structure (e.g., polyglycine, polyleucine, polyalanine, peptides found in naturally occurring beta-sheet-containing proteins as in silk fibroin, oligomers comprising a sufficient ratio of amino acids or synthetic structures having a propensity to form a beta sheet that the oligomer itself has such a propensity [33], etc.). Beta sheet-forming peptides of appropriate length can be covalently attached to silicon components and can then form intermediate strength beta sheet crosslinks between the silicon components. The length of the beta-sheet-forming peptide necessary to provide an intermediate strength crosslink can be empirically determined; a series of beta-sheet forming peptides of similar composition and varying in length can be attached to silicon components and the resulting material separated and tested to determine whether the material contains a plurality of intermediate-strength bonds as described herein.

Other examples of crosslinking components which can be used include peptides having a propensity to form coiled-coils, for example peptides found in naturally occurring keratins, fibrinogen, myosin, and tropomysin. A peptide from a protein forming a collagen or collagenlike structure with a left-handed three-fold helix [15] may also be used as a crosslinking component, either with or without the characteristic covalent crosslinks found in natural collagen. In addition, a peptide which mimics these naturally occurring structures and forms a similar secondary or higher order structure held together by an intermediate strength bond can also be used as a crosslinking component.

Another example of a crosslinking component which may be used is an ionomer, or ionic polymer [35, 36]. An ionomer having a given charge can be used as a crosslinking component on a first silicon component, which can then be crosslinked to an ionomer of the opposite charge on a second silicon component. The particular structure of the ionomer is not critical, and can vary in chemical composition, charge density, size, and total net charge, so long as first and second silicon components respectively comprising ionomers of opposite charge can bind to each other to form an intermediate strength bond. The ionomer can comprise nonbiological subunits (polymeric subunits comprising charged groups, for example amines, phosphates, carboxylates, sulfates, etc.), biological subunits (e.g. amino acids such as aspartic acid, glutamic acid, lysine, arginine, as well as branching amino acids), or mixtures of biological and non-biological subunits.

Where the crosslinking components are covalently linked to two silicon components, the crosslinking components are designed to have a plurality of domains that form secondary structures which are held together by intermediate-strength forces, so that the domains can reversibly unfold and elongate in a modular fashion, as do the high-toughness molecular domains in lustrin [16] and titin [34]. Any domain which can form an internal structure with such characteristics can be used in the crosslinking component, for example an alpha helix-forming peptide, a beta sheet-forming peptide, or other protein domains held by such forces. "Ionic-loops" [35, 36], copolymer chains with lengths of positively charged units adjacent to negatively charged units that reversibly fold up on themselves in secondary structure domains, can also be used as intermediate strength folding domains in this approach. The crosslinking components may have 2, 3, 4, 5, 6, 7, 8, 9, 10, 12, 15, 20, 25, 30, 35, 40, 45, 50, 100 or more such domains where covalently bound to two silicon components.

Peptides used as crosslinking components may be obtained in any manner which provides suitably pure components able to be coupled to the silicon components and to form intermediate strength crosslinks which can be rehealed after subjection of the material to a damaging stress incidence. The peptides can be obtained from proteins purified from a natural or recombinant source. The peptides can be synthesized; a variety of methods are known for producing synthetic peptides. The peptides can be homopeptides or heteropeptides. The peptides may be obtained in a form which provides the intermediate strength crosslinks, or may be treated so that they the structure necessary to form the intermediate strength crosslinks, for example altering the solvent composition, refolding the peptide, use of denaturants, etc. A number of techniques are known in the art for altering peptide secondary and/or higher order structures. Chemistries for producing polymeric structures are well established and may be used for preparing nonpeptide crosslinking components or portions of crosslinking components, including those known for forming modular molecular loops and ionomers.

Attachment of the Silicon Component to the Crosslinking Component

Any coupling scheme which results in the crosslinking components being attached to the silicon components can be used. The crosslinking components may be indirectly attached, for example by being linked to a material which binds to the silicon component or a material attached thereto, directly or indirectly; in such a case, the strength of the bond between the crosslinking component and the silicon component significantly exceeds the intermediate strength of the reversible crosslinks. Preferably the crosslinking components are covalently attached to the silicon component. The crosslinking components can be grafted onto the ends of linear silicon components in the manner of block copolymers, can be "side"-grafted onto linear or nonlinear silicon components, or can be both end and side-grafted onto the silicon component.

As one example, the carboxyl terminus ("C-terminus") of peptide chains or the ends of carboxyl-terminated synthetic block polymers may be covalently bound to siloxane groups that are functionalized with alkylamine pendant groups via amide formation by a simple condensative coupling reaction. For the attachment of crosslinking agents in which a coupling reaction other than peptide coupling is required, there are many other chemical routes available that are well known to those who are versed in the art [see, for example, ref. 22]. Most varieties of siloxane materials may be easily made and are commercially available with reactive groups (e.g. vinyl, hydride, silanol, amine, epoxy, hydroxyalkyl, methacrylate, acrylate, mercapto, chloroalkyl, carboxylate, chlorine, acetoxy, dimethylamine, and alkoxy functionalities) incorporated at a desired molar fraction of silicon atoms which can be used to couple to crosslinking components. The scientific and patent literature contains several examples of siloxane-peptide and other siloxane-organic coupling reactions [5–9, 22–32] which can be adapted or incorporated for use in producing the materials described herein. Spacers or linkers may be used in coupling the reactive groups to the silicon components, between the silicon and crosslinking components, and/or within either or both components. Examples of spacers or linkers are optionally substituted polyethyleneglycols, dicarboxylic acids, polyamines, straight, branched, or cyclic alkyls, aryls, and alkylaryls. The linker is preferably inert and does not cause side reactions with the subsequent chemistry used. The derivatizable sites can optionally be protected initially by protecting groups compatible with the synthesis scheme being used. Among a wide variety of protecting groups which are useful are FMOC, BOC, t-butyl esters, t-butyl ethers, and the like. Various exemplary protecting groups are described in, for example, Atherton et al., Solid Phase Peptide Synthesis, IRL Press (1989).

The Intermediate Strength Crosslinks

The intermediate strength of the crosslinks between the copolymers is a key feature of the invention. A single crosslinked pair of first and second crosslinking components bind to each other with an energy of at least about 30 piconewtons (pN), preferably at least about 50 pN, and may be at least about 100 pN, and less than about 1000 pN, preferably less than about 500 pN, and may be less than about 300 pN. The bond energies can also be characterized as falling within the range 0.05 and 1 electron volt (eV), or the equivalent in kcal/mol.

The strength of the individual crosslinks can be measured by techniques known in the art for manipulating molecules and measuring the strength required for their deformation [16, 34, 37, 38]. For example, atomic force microscope (AFM) cantilevers, optical tweezers or traps, magnetic tweezers or glass microfibers can be used to measure the force as the material is stressed. The measurements obtained from the crosslinked copolymeric material during deformation will exhibit a series of steps corresponding in force to bonds of intermediate strength as defined above. Individual crosslinks between crosslinking components of a binding pair are disrupted as the material is stressed, and may form new crosslinks with new binding partners as material is stretched and deformed. Where the crosslinks contain intra-chain intermediate strength components provided from the binding energy of the individual components, the crosslinks are individually unfolded as the material is stressed, and can refold and reform upon release of the material from the stress incidence.

The number of crosslinks, the percent crosslinking, and the strength of an individual crosslink can be chosen in order to obtain a crosslinked copolymeric material having the desired characteristics. If the individual crosslinks are of too high a strength and/or the percent crosslinking is too high, a material which does not self-heal can be formed.

Self-Healing

The material must exhibit at least about 5% self-healing, and may exhibit at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% self-healing. Preferably the material exhibits at least about 50% self-healing, and may exhibit up to about 100% self-healing. Where a material is originally formed with a submaximal level of crosslinks, the material may self-heal to form a greater number of crosslinks than originally present.

The self-healing can be exhibited in the absence of added solvent. The self-healing can also be induced or accelerated by including an appropriate solvent (or solution) in channels or capsules within the material which, when the material is subjected to a damaging stress incidence, release their contents allowing the material to reheal or to reheal more rapidly. One or more different solvents and/or solutions may be so included in the material. The channels or capsules may contain mono- or oligomeric silicon and/or copolymeric materials, and may be accompanied by capsules containing polymerization activator; upon a damaging stress incidence, the materials are released and activated and are incorporated to heal the existing damaged material [20, 21].

Alternatively, it may be desirable in some instances to entirely reshape the material, for example where the desired use of the material has changed, or where wastage or recycled material from an earlier production of the crosslinked material is to be reshaped. In such cases, the material can be solubilized with a solvent or solvent system and cast into the then-desired form. Alternatively or in addition, thermal treatment can be used to reshape the material.

Self-healing can be tested in the following fashion. The material to be tested is placed in a cylinder. A piston is placed into the cylinder; the piston fits the cylinder with a closely-toleranced slip-fit, allowing smooth sliding without extrusion of the sample material around the piston. The piston has a grid on its face which allows the material to pass through the gaps in the grid as the piston is depressed. The piston also is attached to a device which can measure the force exerted on the piston as it passes back and forth through the cylinder. The piston is pushed into or through the material in a first direction, and the force required to push the piston is measured. The material is allowed time to reheal (this time can be varied in a series of test runs to demonstrate the time profile of healing). The piston is then moved in a second direction in the cylinder and the force required to move the piston through the material is measured. The difference between the force required to move the piston in the first direction and the force required in the second direction provides a measure of the self-healing that occurred in the healing period. Typical silicones subjected to this test exhibits good toughness during the initial motion of the piston; however, no self-healing occurs after the piston first passes through the silicone, and so the silicone does not exhibit any toughness on the piston's return. The copolymeric material of the present invention, by contrast, exhibits toughness in each direction. Another test which may be applied is sequential tensile testing; the material is tested for tensile strength while subjected to a stress, then allowed to self-heal, and tested again. Another simple nonquantitative test that can be used to exhibit self-healing is to cut a copolymeric material with a razor blade, and then place the cut portions into contact with each other; adherence of the two cut portions upon contact demonstrates the existence of some degree of self-healing within the test material.

The self-healing time needed varies with the intended application of the material, and the material's composition is chosen to provide a sufficient self-healing time for that application. The material will desirably exhibit an average self-healing time less than the time interval between damaging forces experienced by the material in typical use. The time which the material takes to self-heal may be nearly instantaneous (less than, or a small fraction of, a second) or may take several minutes, and can be at least about 0.5 seconds, at least about 1 second, at least about 2 seconds, at least about 3 seconds, at least about 4 seconds, at least about 5 seconds, at least about 6 seconds, at least about 7 seconds, at least about 10 seconds, at least about 15 seconds, at least about 20 seconds, at least about 25 seconds, or at least about 30 seconds, and typically is about 10 minutes or less, and may be about 7 minutes or less, about 6 minutes or less, about 5 minutes or less, about 4 minutes or less, about 3 minutes or less, about 2 minutes or less, about 1 minute or less, about 30 seconds or less, about 15 seconds or less, or about 10 seconds or less. The composition of the material can be adjusted to provide the desired self-healing time, for example by adjusting the size of the silicon component(s), the degree of crosslinking, the strength of the intermediate strength crosslinks, etc.

Where the self-healing of the material is to be aided by solvents or the material is to be recast, exemplary solvents and solvent systems which can be tested for use include acetal (1,1-diethoxyethane), acetic acid, acetone, acetonitrile, acetylacetone, acrylonitrile, adipontrile, allyl alcohol, allylamine, 2-aminoisobutanol, benzal chloride, benzaldehyde, benzene, benzonitrile, benzyl chloride, bromochloromethane, bromoform (tribromomethane), butyl acetate, butyl alcohol, sec-butyl alcohol, tert-butyl alcohol, butylamine, tert-butylamine, butyl methyl ketone, p-tert-butyltoluene, γ-butyrolactone, caprolactam, carbon disulfide, carbon tetrachloride, 1-chloro-1,1-difluoroethane, chlorobenzene, chloroform, chloropentafluoroethane, cumene (isopropylbenzene), cyclohexane, cyclohexanol, cyclohexanone, cyclohexylamine, cyclopentane, cyclopentanone, p-cymene, cis-cecalin, trans-cecalin, diacetone alcohol, 1,2-dibromoethane, dibromofluoromethane, dibromomethane, 1,2-dibromotetrafluoroethane, dibutylamine, o-dichlorobenzene, 1,1-dichloroethane, 1,2-dichloroethane, 1,2-dichloroethylene, cis-1,2-dichloroethylene, trans-1,2-dichloroethylene, dichloroethyl ether, dichloromethane, 1,2-dichloropropane, 1,2-dichlorotetrafluoroethane, diethanolamine, diethylamine, diethyl carbonate, diethylene glycol, diethylene glycol dimethyl ether, diethylene glycol monoethyl ether, diethylene glycol monoethyl ether acetate, diethylene glycol monomethyl ether, diethylenetriamine, diethyl ether, diisobutyl ketone, diisopropyl ether, N,N-dimethylacetamide, dimethylamine, dimethyl disulfide, N,N-dimethylformamide, dimethyl sulfoxide, 1,4-dioxane, 1,3-dioxolane, dipentene, epichlorohydrin, ethanolamine (glycinol), ethyl acetate, ethyl acetoacetate, ethyl alcohol, ethylamine, etheylbenzene, ethyl bromide, ethyl chloride, ethylene carbonate, ethylenediamine, ethylene glycol, ethylene glycol diethyl ether, ethylene glycol dimethyl ether, ethylene glycol monobutyl ether, ethylene glycol monoethyl ether, ethylene glycol ethyl ether acetate, ethylene glycol monomethyl ether, ethylene glycol momomethyl ether acetate, ethyl formate, furan, furfural, furfuyl alcohol, glycerol, heptane, 1-heptanol, hexane, 1-hexanol (caproyl alcohol), hexylene glycol, hexyl methyl ketone, isobutyl acetate, isobutyl alcohol, isobutylamine, isopentyl acetate, isophorone, isopropyl acetate, isopropyl alcohol, isoquinoline, d-limonene (citrene), 2,6-lutidine, mesitylene, mesityl oxide, methyl acetate, methylal, methyl alcohol, methylamine, methyl benzoate, methylcyclohexane, methy ethyl ketone, N-methylformamide, methyl formate, methyl iodide, methyl isobutyl ketone, methyl isopentyl ketone, 2-methylpentane, 4-methyl-2-pentanol, methyl pentyl ketone, methyl propyl ketone, N-methyl-2-pyrrolidone, morpholine, nitrobenzene, nitroethane, nitromethane, 1-nitropropane, 2-nitropropane, octane, 1-octanol, pentachloroethane, pentamethylene glycol, pentane, 1-pentanol, pentyl acetate, 2-picoline, α-pinene, β-pinene, piperidine, propanenitrile, propyl acetate, propyl alcohol, propylamine, propylbenzene, propylene glycol, pseudocumene, pyridine, pyrrole, pyrrolidine, 2-pyrrolidone, quinoline, styrene, sulfolane, α-terpinene, 1,1,1,2-tetrachloro-2,2-difluoroethane, 1,1,2,2-tetrachloro-1,2-difluoroethane, 1,1,1,2-tetrachloroethane, 1,1,2,2-tetrachloroethane, tertrachloroethylene, tetraethylene glycol, tetrahydrofuran, 1,2,3,4-tetrahydronaphthalene, tetrahydropyran, tetramethylsilane, toluene, o-toluidine, triacetin, tributylamine, 1,1,1-trichloroethane, 1,1,2-trichloroethane, trichloroethylene, trichlorofluoromethane, 1,1,2-trichlorotrifluoroethane, triethanolamine, triethylamine, triethylene glycol, triethyl phosphate, trimethylamine, trimethylene glycol, trimethyl phosphate, veratrole, o-xylene, m-xylene, p-xylene, mixtures thereof, and aqueous mixtures thereof. The solvent system may also include organic and/or inorganic solutes. Solutes of interest include those useful for solubilizing the silicon component, the crosslinking component, or both. Solutes of particular interest include alkali metal salts, i.e. salts of lithium, sodium, potassium, rubidium, cesium, and francium. Of particular interest are the alkali metal hailed, especially lithium bromide. Mixed solvent systems may be necessary to achieve the proper balance of hydrophobic and hydrophilic characteristics for healing or recasting a given crosslinked copolymeric material.

For example, a 4–5% side-grafted aminopropyl-functionalized polydimethylsiloxane (AP-PDMS) when coupled to polyglycine 18 mers produced a semisolid gel exhibiting intermediate strength crosslinks and self-healing properties (Example 1); when contacted with a razor blade, the gel was difficult to cut, and reformed when the cut portions were placed in contact with each other (Example 2). A 3% aminopropyl functionalized phenylsilsesquioxane $[(NH_2(CH_2)_3)_{0.03}Ph_{0.97}SiO_{3/2}]$ grafted with the same polyglycine 18 mer produced a solid gel that did not exhibit self-healing after cutting with a razor blade, which can be attributed to a need for greater than 3% crosslinking with the inherently brittle phenylsilsesquioxanes.

EXAMPLES

The following examples are set forth so as to provide those of ordinary skill in the art with a complete description of how to make and use the present invention, and are not intended to limit the scope of what is regarded as the invention. Efforts have been made to ensure accuracy with respect to numbers used (e.g., amounts, temperature, etc.) but some experimental error and deviation should be accounted for. Unless otherwise indicated, parts are parts by weight, temperature is degree centigrade and pressure is at or near atmospheric, and all materials are commercially available.

Example 1
Formation of a Noncovalently Crosslinked Organosiloxane-polypeptide Block Copolymer To protect the peptide component from self-polymerizing during coupling to the siloxane, the peptide amino-terminus was blocked by the addition of a tert-butyloxycarbonate (BOC) end-capping group. 0.57 g ($5.6 \times 10^{-3}$ mol) of triethylamine was added to a mixture of 0.30 g (~$3 \times 10^{-4}$ mol) of polyglycine (Sigma/Aldrich, molecular mass ~1000 amu, degree of polymerization ~18 amino acid residues) in 15 ml of deionized water and stirred for 20 minutes, producing a well-dispersed translucent emulsion. 0.52 g ($3.2 \times 10^{-4}$ mol) of the blocking agent, 2-(tert-butoxycarbonyloxyimino)-2-phenylacetonitrile ("BOC-ON", Sigma/Aldrich), was added and the solution was stirred for 24 hours. Byproducts of the reaction were removed from the aqueous polyglycine emulsion by three extraction steps with 50 ml of clean ethylacetate each time.

The protected polypeptide was then coupled with aminopropyl-functionalized polydimethylsiloxane (AP-PDMS). Aqueous polyglycine emulsion was added to a solution of 0.50 g of 4–5% side-grafted AP-PDMS (Gelest, molecular weight ~7500 amu, degree of polymerization ~100 Si—O units) dissolved into 25 g of tetrahydrofuran (THF), creating a biphasic liquid mixture. 65 mg ($3.4 \times 10^{-4}$ mol) of the coupling agent N-(3-dimethylaminopropyl)-N'-ethylcarbodi imide ("EDC", Sigma/Aldrich) was added, and the mixture was stirred for 24 hours. The hybridized siloxane was obtained as a gel-like precipitate located in the water-rich lower liquid level, below the THF-rich upper liquid level.

Figure 1:
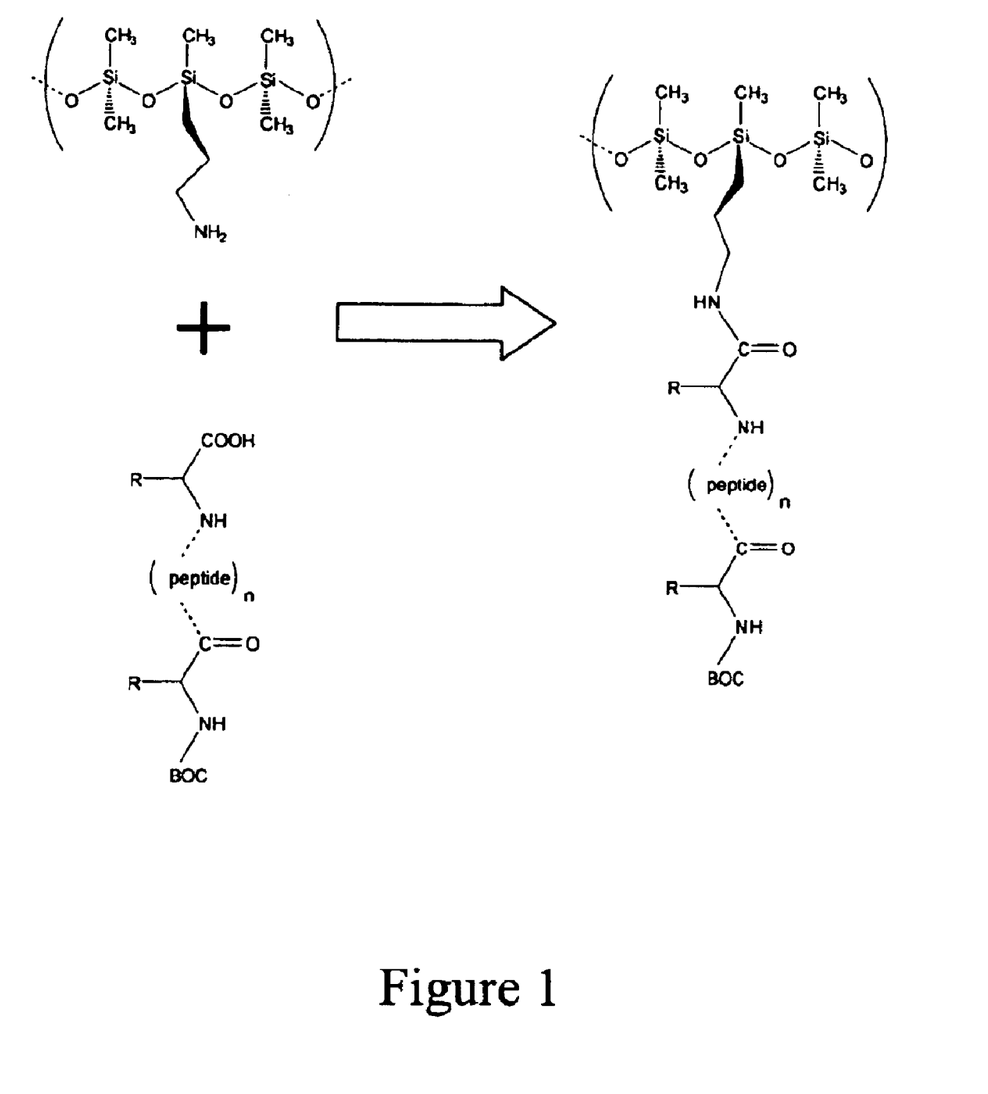
FIG. 1 is a schematic representation of the coupling of an aminopropyl-functionalized polydimethylsiloxane with a secondary structure forming polypeptide segment.
Figure 2:
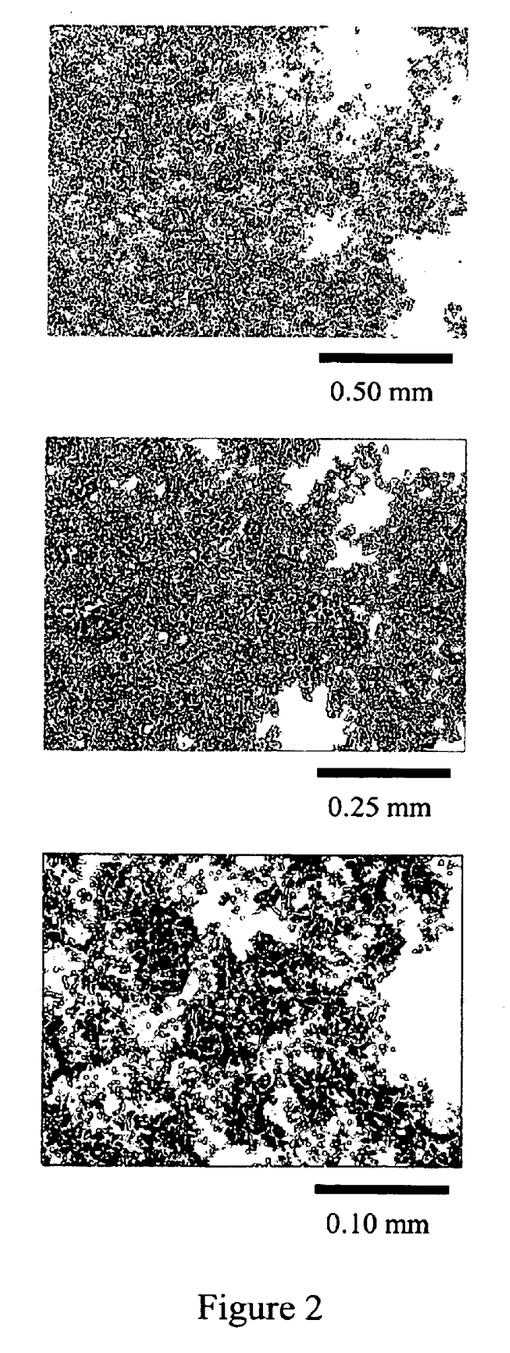
FIG. 2 shows micrographs of single-phase polydimethylsiloxane-polyglycine hybrid gel material at magnifications of 100×, 200× and 500×.
Figure 3:
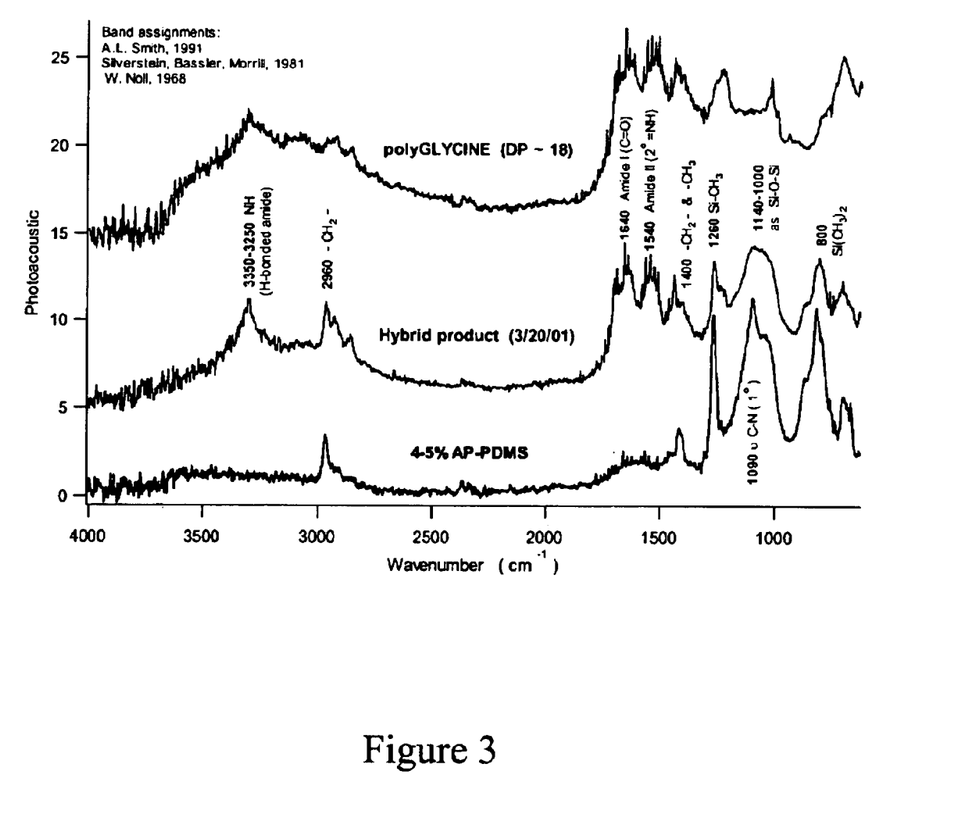
FIG. 3 is an infrared spectrum of polydimethylsiloxane-polyglycine hybrid gel material compared to those of the individual polysiloxane and polypeptide components.

Microscopic characterization of the precipitate (FIG. 2) revealed a transparent, single-phase rubber-like material. Infrared spectroscopic analyses (FIG. 3) demonstrated that the siloxane and peptide components are both present in the material. Crosslinking of the siloxane as a result of incorporation of the polyglycine component was unambiguously demonstrated by the conversion of the liquid precursor AP-PDMS to the solid gel.

Example 2
Self-healing of a Crosslinked Copolymeric Materials

The gel produced in Example 1 was cut in half with a razor blade as a model stress incidence. The two halves of the gel were then held in contact with each other; self-healing occurred immediately on contact (less than one second). The two halves remained together upon release of the force holding them together, demonstrating that crosslinks had reformed within the material. Upon subsequent deformation after rehealing, the gel showed no tendency to tear in the same location, indicating that the initial fracture surface had regained the bulk strength of the original material.

REFERENCES

1. R. H. Baney, et al., "Silsesquioxanes", Chem. Rev. 1995, 95:1409.
2. A. L. Smith, *The Analytical Chemistry of Silicones*, John Wiley & Sons, Inc., New York, 1991.
3. W. C. Wake, "Silicone adhesives, sealants, and coupling agents," *Crit. Rep. Appl. Chem.* 1987, 16:89.
4. W. Noll, *Chemistry and Technology of Silicones*, Academic, New York, 1968.
5. U.S. Pat. No. 2,710,290, Safford, et al., General Electric Co., Jun. 7, 1955: "Organopolysiloxane-polytetrafluoroethylene mixtures."
6. H. A. Vaughn, Jr., "The synthesis and properties of alternating block copolymers of dimethylsiloxane and bisphenol-A carbonate," *Polymer Letters* 1969
7. U.S. Pat. No. 3,189,662, Vaughn, Jr., General Electric Co., Jun. 15, 1965: "Organopolysiloxane-polycarbonate block copolymers."
8. U.S. Pat. No. 3,832,419, Merritt, Jr., General Electric Co., Aug. 27, 1974: "Organopolysiloxane-polycarbonate block copolymers."
9. U.S. Pat. No. 3,821,325, Merritt, Jr., et al., General Electric Co., Jun. 28, 1974: "Organopolysiloxane-polycarbonate block copolymers."
10. S. Mann, *Biomimetic Materials Chemistry*, VCH, New York, 1996.
11. S. H. Imam, R. V. Greene, and B. R. Zaidi, *Biopolymers: Utilizing Nature's Advanced Materials*, American Chemical Society, Washington, D.C., 1999.
12. A. H. Heuer, et al., "Innovative materials processing strategies: a biomimetic approach," *Science* 1992, 255:1098.
13. L. L. Hench, "Biomaterials," *Science* 1980, 208:826.
14. National Materials Advisory Board, *Hierarchical Structures in Biology as a Guide for New Materials Technology*, National Academy Press, 1994.
15. J. Vincent, *Structural Biomaterials*, Princeton University Press, Princeton, 1990.
16. B. L. Smith, et al., "Molecular Mechanistic origin of the toughness of natural adhesives, fibers and composites," *Nature* 1999, 399:761.
17. J. H. Waite, "Marine adhesive proteins: natural composite thermosets," *Int. J. Biol. Macromol.* 1990, 12:139.
18. R. D. B. Fraser and T. P. MacRae, *Conformation in Fibrous Proteins and Related Synthetic Polypeptides*, Academic Press, New York, 1973.
19. S. R. White, et al., "Autonomic healing of polymer composites," *Nature* 2001, 409:794.

20. R. P. Wool, *Polymer Interfaces: Structure and Strength*, Chapt. 12, pp. 445–479, Hanser Gardner, Cincinnati, 1995.
21. C. Dry, "Procedures developed for self-repair of polymeric matrix composite materials," *Comp. Struct.* 1996, 35:263.
22. U.S. Pat. No. 3,562,353, Chow, U.S. Dept. of Health, Education, and Welfare, Feb. 9, 1971: "Alpha-amino acid polyamide-organosilicon compositions."
23. M. Svensson, et al., "Phase properties in relation to mesogen length in chiral side-chain polysiloxanes," *Polymer* 1997, 38:3269.
24. J. Imperante, et al., "Silicone protein copolymers," *Soaps/Cosmetics/Chemical Specialties* 1994, October, pp 32–40.
25. H. Zhang and J. A. Gardella, Jr., "Solvent effects on the surface composition of bisphenol A polycarbonate and polydimethylsiloxane (BPAC-PDMS) random block copolymers," *Macromolecules* 1997, 30:3632, and references 2–9 therein.
26. S. D. Smith, et al., "Synthesis and characterization of poly(methylmethacrylate)-g-poly (dimethylsiloxane) copolymers. 1. Bulk and surface characterization," *Macromolecules* 1992, 25:2575.
27. European Patent Application #0,525,741-A1, Nakashima, Dow Coming Toray Silicone Co, Ltd., filed Jul. 29, 1992: "Silicone-modified polyimide resin and method for preparing same."
28. U.S. Pat. No. 4,604,442, Rich, General Electric Co., Aug. 5, 1986: "Organopolysiloxane-polyamide block polymers and method for making."
29. U.S. Pat. No. 4,675,372, Policastro, General Electric Co., Jun. 23, 1987: "Method for making cross-linked silicone-polyamide block polymers."
30. I.-K. Kang, et al., "Synthesis, antithrombogenicity and gas permeability of copolypeptides having silyl groups or dimethylsiloxane oligomers substituted in the side chains," *Int. J. Biol. Macromol.* 1988, 10:169.
31. C. M. Kania, et al., "Preparation of poly(dimethylsiloxane)-polypeptide block copolymers," *J. Appl. Polym. Sci.* 1982, 27:139.
32. F. J. Feher, et al., "Octafunctionalized polyhedral oligosilsesquioxanes as scaffolds: synthesis of peptidyl silsesquioxanes," *Chem. Commun.* 1998, pp. 1469–1470.
33. J. Hwang and T. Deming, "Methylated mono- and di(ethylene glycol)-functionalized B-sheet forming polypeptides," *Biomacromolecules* 2001, 2:17.
34. M. Rief, et al., "Reversible unfolding of individual titin immunoglobulin domains by AFM," *Science* 1997, 276:1109.
35. K. Kurihara, M. Kamachi, and J. K. Stille, "Synthesis of ionic block polymers for desalination membranes," *J. Polym. Sci.* 1973, 11:587–610.
36. S. E. Kudaibergenov, "Recent advances in the study of synthetic polyampholytes in solutions," *Advances in Polym. Sci.* 1999,144:115–197.
37. J. B. Thompson, et al., "Bone indentation recovery time correlates with bond reforming time," *Nature* 2001, 414:773–776.
38. S. R. White, et al., "Autonomic healing of polymer composites," *Nature* 2001, 409:794–797.

Although the invention has been described in some detail with reference to the preferred embodiments, those of skill in the art will realize, in light of the teachings herein, that certain changes and modifications can be made without departing from the spirit and scope of the invention. Accordingly, the invention is limited only by the claims.

What is claimed is:

1. A crosslinked copolymeric material comprising first and second copolymers, said first copolymer comprising:
   at least one first silicon component attached to at least two first crosslinking components in the form of a block copolymer, a graft copolymer, or a combination thereof;
   wherein the first silicon component comprises a polymer selected from the group consisting of a silicate, a siloxane, a silsesquioxane, and a mixture of any two or more thereof;
   wherein the first crosslinking components are polymers selected from the group consisting of a first beta-sheet forming peptide, a first coiled-coil forming peptide, a first triple-helix forming peptide, and a first ionomer;
   said second copolymer comprising:
   at least one second silicon component attached to at least two second crosslinking components in the form of a block copolymer, a graft copolymer, or a mixture thereof;
   wherein the second silicon component comprises a polymer selected from the group consisting of a silicate, a siloxane, a silsesquioxane, and a mixture of any two or more thereof;
   wherein the second crosslinking components are polymers selected from the group consisting of a second beta-sheet forming peptide, a second coiled-coil forming peptide, a second triple-helix forming peptide, and a second ionomer;
   wherein the second copolymer can be the same as or different than the first copolymer;
   wherein the first and second crosslinking components interact to form a plurality of noncovalent intermediate strength crosslinks within the material of at least about 30 piconewtons and less than about 1000 piconewtons in strength;
   wherein the crosslinked material exhibits at least about 5% self-healing upon disruption of its structure.

2. The material of claim 1, wherein the first and second crosslinking components are beta-sheet forming peptides.

3. The material of claim 2, when the first and second crosslinking components form an antiparallel beta sheet.

4. The material of claim 2, when the first and second crosslinking components form a parallel beta sheet.

5. The material of claim 2, wherein the beta-sheet forming peptides are selected from polyalanine, polyglycine, polyleucine, and a silk fibroin peptide.

6. The material of claim 1, wherein the first and second crosslinking components are coiled-coil forming peptides.

7. The material of claim 6, wherein the coiled-coil forming peptides are selected from a keratin peptide, a myosin peptide, a tropomyosin peptide, and a fibrinogen peptide.

8. The material of claim 1, wherein the first and second crosslinking components are triple-helix forming peptides.

9. The material of claim 8, wherein the first and second crosslinking components are collagen peptides.

10. The material of claim 1, wherein the first and second crosslinking components are ionomers.

11. The material of claim 1, wherein the first silicon component is attached to the first crosslinking components in the form of a block copolymer.

12. The material of claim 1, wherein the first silicon component is attached to the first crosslinking components in the form of a graft copolymer.

13. The material of claim 1, wherein the first silicon component is attached to the first crosslinking components in a combination of both block copolymer and graft copolymer forms.

14. The material of claim 1, wherein the plurality of noncovalent intermediate strength crosslinks within the material are at least about 50 piconewtons in strength.

15. The material of claim 1, wherein the plurality of noncovalent intermediate strength crosslinks within the material are at least about 100 piconewtons in strength.

16. The material of claim 1, wherein the plurality of noncovalent intermediate strength crosslinks within the material are less than about 500 piconewtons in strength.

17. The material of claim 1, wherein the plurality of noncovalent intermediate strength crosslinks within the material are less than about 300 piconewtons in strength.

18. The material of claim 1, wherein the combined number of first and second crosslinking components on the first and second copolymers is at least five.

19. The material of claim 1, wherein the combined number of first and second crosslinking components on the first and second copolymers is at least seven.

20. The material of claim 1, wherein the combined number of first and second crosslinking components on the first and second copolymers is at least ten.

21. The material of claim 1, wherein the combined number of first and second crosslinking components on the first and second copolymers is at least fifteen.

22. The material of claim 1, further comprising covalent crosslinks.

23. The material of claim 1, wherein the first silicon component comprises a silicate.

24. The material of claim 1, wherein the first silicon component comprises a siloxane.

25. The material of claim 1, wherein the first silicon component comprises a silsesquioxane.

26. The material of claim 1, wherein the first silicon component comprises a mixture of any two or more of a silicate, a siloxane, and a silsesquioxane.

27. The material of claim 1, wherein the material is a gel.

28. The material of claim 1, wherein the material is a solid.

29. An adhesive comprising the material of claim 1.

30. An armor comprising the material of claim 1.

31. A coating comprising the material of claim 1.

32. A thermal insulator comprising the material of claim 1.

33. An optical component comprising the material of claim 1.

34. An electrical component comprising the material of claim 1.

35. A biomedical device comprising the material of claim 1.

36. A method of recasting a copolymeric material having a first shape, comprising denaturing the material of claim 1, and recasting the material.

37. The method of claim 36, wherein denaturing the material comprises heating the material.

38. The method of claim 36, wherein denaturing the material comprises solubilizing at least a component of the material with a solvent which allows crosslinks to form.

39. The method of claim 36, wherein recasting the material heals a deformation in the material.

40. The method of claim 36, wherein recasting the material forms the material into a new shape.

41. A crosslinked copolymeric material comprising first and second copolymers, said first copolymer comprising:

at least one first silicon component attached to at least two first crosslinking components in the form of a block copolymer, a graft copolymer, or a combination thereof;

wherein the first silicon component comprises a polymer selected from the group consisting of a silicate, a siloxane, a silsesquioxane, and a mixture of any two or more thereof;

wherein the first crosslinking components are polymers and comprise at least two intermediate strength folding domains selected from the group consisting of a first beta sheet-forming peptide, a first alpha helix-forming peptide, and a first modular molecular loop;

said second copolymer comprising:

at least one second silicon component attached to at least two second crosslinking components in the form of a block copolymer, a graft copolymer, or a mixture thereof;

wherein the second silicon component comprises a polymer selected from the group consisting of a silicate, a siloxane, a silsesquioxane, and a mixture of any two or more thereof;

wherein the second crosslinking components are polymers and comprise at least two intermediate strength folding domains selected from the group consisting of a second beta sheet-forming peptide, a second alpha helix-forming peptide, and a second modular molecular loop;

wherein the second copolymer can be the same as or different than the first copolymer;

wherein the first and second crosslinking components may be the same or different, and at least one of the first and second crosslinking components is the same molecule and is covalently attached to both the first and second silicon components, wherein the intermediate strength folding domains form a plurality of intermediate strength crosslinks within the material of at least about 10 piconewtons and less than about 1000 piconewtons in strength;

wherein the crosslinked material exhibits at least about 5% self-healing upon disruption of its structure.

42. A method of recasting a copolymeric material having a first shape, comprising denaturing the material of claim 41, and recasting the material.

43. The method of claim 42, wherein denaturing the material comprises heating the material.

44. The method of claim 42, wherein denaturing the material comprises solubilizing at least a component of the material with a solvent which allows crosslinks to form.

45. The method of claim 42, wherein recasting the material heals a deformation in the material.

46. The method of claim 42, wherein recasting the material forms the material into a new shape.

47. The method of claim 1, wherein the second copolymer is different than the first copolymer.

48. The method of claim 41, wherein the second copolymer is different than the first copolymer.

* * * * *